US011876709B2

(12) United States Patent
Akiyama (10) Patent No.: US 11,876,709 B2
(45) Date of Patent: Jan. 16, 2024

(54) MONITORING DEVICE, REDUNDANCY SWITCHING METHOD, REDUNDANCY SWITCHING PROGRAM, AND NETWORK SYSTEM

(71) Applicant: Nippon Telegraph and Telephone Corporation, Tokyo (JP)

(72) Inventor: Takayuki Akiyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 84 days.

(21) Appl. No.: 17/617,892

(22) PCT Filed: Jun. 14, 2019

(86) PCT No.: PCT/JP2019/023603
§ 371 (c)(1),
(2) Date: Dec. 9, 2021

(87) PCT Pub. No.: WO2020/250407
PCT Pub. Date: Dec. 17, 2020

(65) Prior Publication Data
US 2022/0311708 A1 Sep. 29, 2022

(51) Int. Cl.
*H04L 45/586* (2022.01)
*H04L 43/20* (2022.01)
(Continued)

(52) U.S. Cl.
CPC ............ *H04L 45/586* (2013.01); *H04L 43/20* (2022.05); *H04L 45/123* (2013.01); *H04L 45/28* (2013.01); *H04L 45/42* (2013.01)

(58) Field of Classification Search
CPC ..... H04L 45/586; H04L 45/123; H04L 45/28; H04L 45/42; H04L 43/20; H04L 43/0817;
(Continued)

(56) References Cited

U.S. PATENT DOCUMENTS 9,219,641 B2 * 12/2015 Chiang .............. H04L 41/0654
10,382,329 B1 * 8/2019 Thomas ................ H04L 61/103
(Continued)

FOREIGN PATENT DOCUMENTS

EP        1041775 A1 * 10/2000 ....... H04L 29/12009
JP       2003258843     9/2003
(Continued)

OTHER PUBLICATIONS

[No. Author Listed] [online], "Highly available configuration with VRRP (L3HA) on Open vSwitch," OpenStack.org, dated Nov. 24, 2016, retrieved from URL <https://docs.openstack.org/liberty/ja/networking-guide/scenario-l3ha-ovs.html>, 33 pages (with English Translation).

(Continued)

*Primary Examiner* — Alina A Boutah
(74) *Attorney, Agent, or Firm* — Fish & Richardson P.C.

(57) ABSTRACT

A monitoring apparatus (1) stores address management information (t1) which indicates address information of each of network devices and also indicates a connection to each of the network devices. A detection section (12) detects a failure of a router (R1) with a notification from each of the network devices. An acquisition section (11) acquires information from each of the network devices to cope with the detected failure. A rewriting section (13) rewrites the address management information (t1) such that a router (R2) has a virtual IP address and a virtual MAC address set in a virtual router VR based on the acquired information.

7 Claims, 9 Drawing Sheets

(51) Int. Cl.
*H04L 41/0853* (2022.01)
*H04L 45/12* (2022.01)
*H04L 45/28* (2022.01)
*H04L 45/42* (2022.01)

(58) Field of Classification Search
CPC .. H04L 41/0654; H04L 41/40; H04L 41/0853
See application file for complete search history.

(56) References Cited

U.S. PATENT DOCUMENTS

| | | | | |
|---|---|---|---|---|
| 2008/0151882 A1* | 6/2008 | Sanjay | ................... | H04L 45/00 370/389 |
| 2008/0225699 A1* | 9/2008 | Lee | ..................... | H04L 45/586 370/389 |
| 2012/0033672 A1* | 2/2012 | Page | ..................... | H04L 45/245 370/395.53 |
| 2013/0070776 A1* | 3/2013 | Sato | ..................... | H04L 45/586 370/401 |
| 2014/0344424 A1* | 11/2014 | Sato | ................... | G06F 9/45558 709/221 |
| 2015/0117179 A1* | 4/2015 | Sato | ..................... | H04L 45/586 370/219 |
| 2017/0214609 A1* | 7/2017 | Fujii | ................... | H04L 12/4641 |
| 2019/0028403 A1* | 1/2019 | Moldvai | ................ | H04L 47/76 |

FOREIGN PATENT DOCUMENTS

| | | | | |
|---|---|---|---|---|
| JP | 2005318516 A | * | 11/2005 | ......... H04Q 11/0005 |
| JP | 2008295013 A | * | 12/2008 | ............ H04L 12/66 |
| JP | 2011228864 | | 11/2011 | |
| JP | 5814849 B2 | * | 11/2015 | ............ H04L 12/66 |

OTHER PUBLICATIONS

Nadas et al., "Virtual Router Redundancy Protocol (VRRP) Version 3 for IPv4 and IPv6," Internet Engineering Task Force, dated Mar. 2010, retrieved from URL <https://tools.ietf.org/html/rfc5798>, 40 pages.

* cited by examiner

MONITORING DEVICE, REDUNDANCY SWITCHING METHOD, REDUNDANCY SWITCHING PROGRAM, AND NETWORK SYSTEM

CROSS-REFERENCE TO RELATED APPLICATIONS

This application is a National Stage application under 35 U.S.C. § 371 of International Application No. PCT/JP2019/023603, having an International Filing Date of Jun. 14, 2019, the disclosure of which is incorporated in its entirety into this application.

TECHNICAL FIELD

The present invention relates to a monitoring apparatus, a redundancy switching method, a redundancy switching program, and a network system.

BACKGROUND ART

As means for improving availability of a network, there is means in which a plurality of network devices such as routers are disposed and redundancy is thereby performed. As the function of the redundancy, VRRP (Virtual Router Redundancy Protocol) is known (see NPL 1). In the VRRP, a virtual IP address and a virtual MAC address for causing a plurality of routers to be recognized as one virtual router are prepared. In addition, the VRRP implements communication with an external apparatus by using one of the plurality of routers as a master and causing the master to have the virtual IP address and the virtual MAC address.

The individual routers perform a keep alive communication with each other. When the router serving as the master fails, another router is promoted to the master, and takes over the virtual IP address and the virtual MAC address. With such a takeover, it is possible to continue the communication with the external apparatus. When the router promoted to the master detects keep alive communication interruption (communication interruption of a VRRP Advertisement), the router can issue GARP (gratuitous ARP) (ARP: Address Resolution Protocol) included in a broadcast packet to a peripheral apparatus (GARP update) to switch a communication path (redundancy switching).

Herein, in the case where communication based on the VRRP is implemented by a hardware router apparatus, redundancy switching involving the communication interruption of the VRRP Advertisement and the GARP update is performed in, e.g., several seconds. As one setting, when a state in which the VRRP Advertisement is not received for one second (timeout) is repeated three times successively (about three seconds later), redundancy switching is performed.

Unlike the case described above, consideration is given to the case where communication is implemented by a virtual router in a virtual infrastructure. In this case, in OpenStack used in the virtual infrastructure, L3HA (L3 High Availability) (L3 is the third layer of the OSI (Open System Interconnection) reference model) by the virtual router has a function similar to that of the VRRP (see NPL 2). The OpenStack is an open IaaS (Infrastructure as a Service) platform construction infrastructure, and is capable of implementing a cloud infrastructure by combining various software modules.

CITATION LIST

Patent Literature

[NPL 1] "RFC5798", [online], [retrieved on Jun. 4, 2019], Internet <URL:https://tools.ietf.org/html/rfc5798>
[NPL 2] "High-availability configuration with VRRP (L3HA) in Open vSwitch", [online], [retrieved on Jun. 4, 2019], Internet <URL:https://docs.openstack.org/liberty/ja/networking-guide/scenario-13ha-ovs.html>

SUMMARY OF THE INVENTION

Technical Problem

However, in the virtual router in the virtual infrastructure, in spite of the fact that the L3HA function is enabled (the VRRP is used for the network in the virtual infrastructure), even when a failure occurs, redundancy switching is not performed immediately (in several seconds). This is because a GARP issue interval of the virtual router having a redundancy function is considerably long due to specifications of the OpenStack, and hence, even when the promotion of another router to the master is performed immediately, it is not possible to perform update of an ARP table of a peripheral apparatus which is required for redundancy switching. According to Neutron used for performing network control in the OpenStack, the GARP issue interval is set to 60 seconds. Accordingly, in the case of the virtual router in the virtual infrastructure, a communication interruption time caused by the occurrence of a failure is prolonged (communication interruption of 60 seconds).

As a result, a problem arises in that the availability of the network in the virtual infrastructure which uses the virtual router is lower than the availability of the network which uses the hardware router apparatus. Even if the GARP issue interval can be set to a short interval, it follows that a broadcast which does not actually make sense is performed frequently during a normal time (non-failure time). Consequently, an inconvenience arises in that a load to various resources (examples: a CPU and the network) in the virtual infrastructure is increased.

In view of such circumstances, an object of the present invention is to improve availability of a network in a virtual infrastructure.

Means for Solving the Problem

In order to solve the above problem, the present invention is a monitoring apparatus for monitoring a plurality of network devices disposed in a network in a virtual infrastructure which uses a virtual router, the monitoring apparatus storing address management information which indicates address information of each of the network devices and also indicates a connection to each of the network devices, the network devices including a first router in which the virtual router is formed and which functions as a master during a non-failure time and a second router in which the virtual router is formed and which functions as the master at a time of a failure and is different from the first router, the monitoring apparatus including: a detection section which detects a failure of the first router with a notification from each of the network devices; an acquisition section which acquires information from each of the network devices to cope with the detected failure; and a rewriting section which rewrites the address management information such that the second router has virtual address information set in the virtual router based on the acquired information.

Effects of the Invention

According to the present invention, it is possible to improve the availability of the network in the virtual infrastructure.

DESCRIPTION OF EMBODIMENTS

Hereinbelow, the mode for carrying out the present invention (hereinafter referred to as "the present embodiment") will be described with reference to the drawings.

[Configuration]

Figure 1:
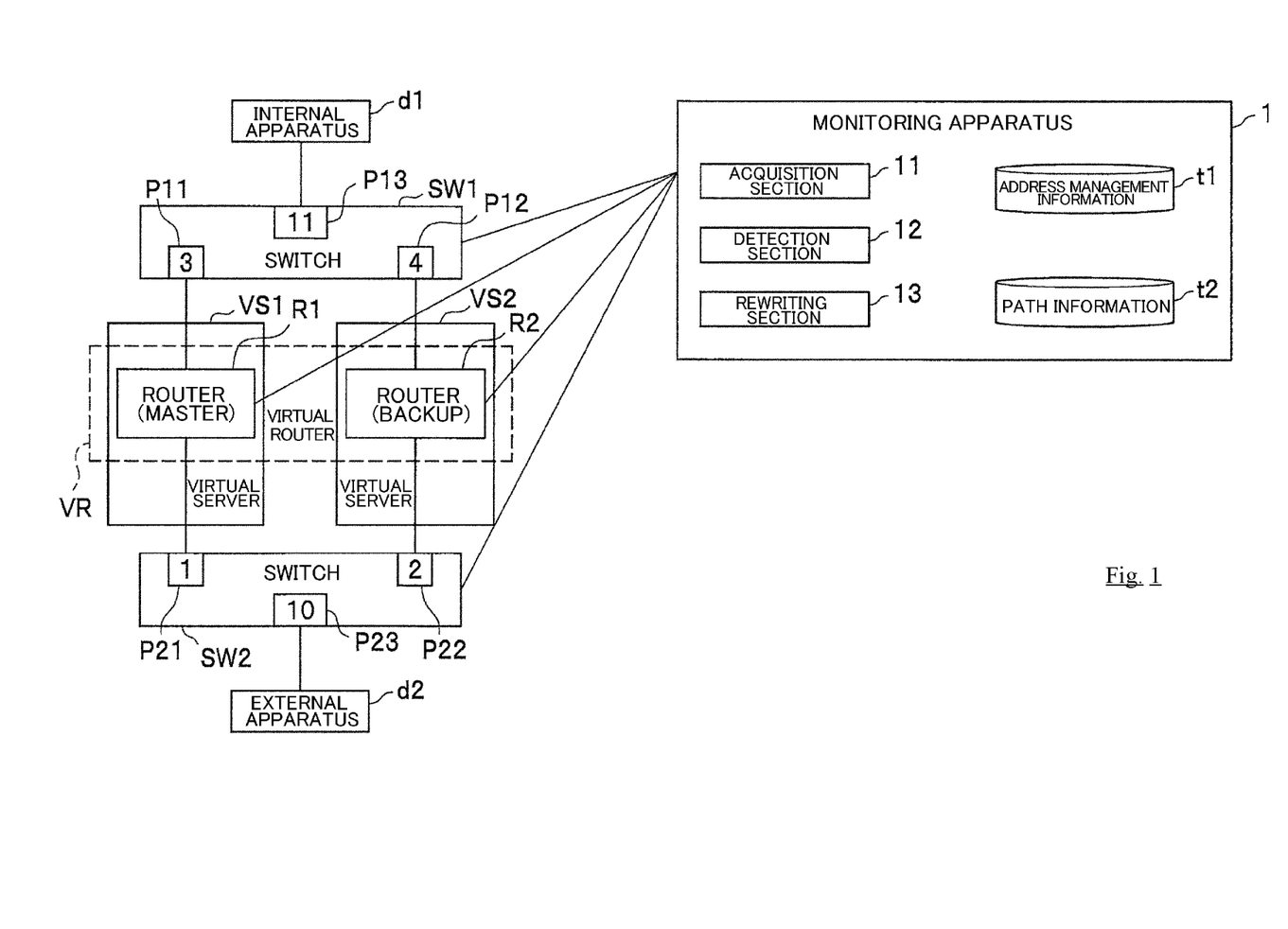
FIG. 1 is a functional configuration diagram of a network system including a monitoring apparatus of the present embodiment.

As shown in FIG. 1, a network system including a monitoring apparatus 1 of the present embodiment includes an internal apparatus d1, an external apparatus d2, switches SW 1 and SW2, and routers R1 (first router) and R2 (second router) in addition to the monitoring apparatus 1. The internal apparatus d1, the external apparatus d2, the routers R1 and R2, and the switches SW1 and SW2 of the network system of the present embodiment are examples, and the network system is not limited to these components.

The internal apparatus d1 is an apparatus which serves as a source or a destination of communication based on VRRP. The internal apparatus d1 can be, e.g., a server apparatus, but the internal apparatus d1 is not limited thereto.

The external apparatus d2 is an apparatus which serves as the source or the destination of the communication based on the VRRP. The external apparatus d2 can be, e.g., a server apparatus, but the external apparatus d2 is not limited thereto.

The switch SW1 is a network device for the internal apparatus d1 to connect to the external apparatus d2 so as to be able to communicate with the external apparatus d2. The switch SW1 can be, e.g., an L2 switch (L2 is the second layer of the OSI reference model), but the switch SW1 is not limited thereto. The switch SW1 includes a port P11, a port P12, and a port P13. The port P11 serves as a connection point to the router R1, and has a port number "3". The port P12 serves as a connection point to the router R2, and has a port number "4". The port P13 serves as a connection point to the internal apparatus d1, and has a port number "11".

The switch SW2 is a network device for the external apparatus d2 to connect to the internal apparatus d1 so as to be able to communicate with the internal apparatus d1. The switch SW2 can be, e.g., an L2 switch, but the switch SW2 is not limited thereto. The switch SW2 includes a port P21, a port P22, and a port P23. The port P21 serves as a connection point to the router R1, and has a port number "1". The port P22 serves as a connection point to the router R2, and has a port number "2". The port P23 serves as a connection point to the external apparatus d2, and has a port number "10".

Each of the routers R1 and R2 is a network device which relays packets transferred on a network. The router R1 operates on a virtual server VS1. The router R2 operates on a virtual server VS2. The routers R1 and R2 constitute the VRRP, and connect to the switches SW1 and SW2. A virtual router VR in the virtual infrastructure is formed for the routers R1 and R2. The internal apparatus d1, the external apparatus d2, and the switches SW1 and SW2 perform communication based on the VRRP with one virtual router VR.

Note that the virtual router VR is independent of the routers R1 and R2 in terms of management of address information and, similarly to the routers R1 and R2, can be handled as a network device.

The routers R1 and R2 adopt a redundancy configuration, and the priority of the router R1 (e.g., 100) is set to be higher than the priority of the router R2 (e.g., 50). Therefore, the router R1 having the higher priority functions as a master.

The monitoring apparatus 1 monitors a plurality of network devices disposed in the network in the virtual infrastructure which uses the virtual router VR. In the configuration shown in FIG. 1, the monitoring apparatus 1 monitors the network devices such as the routers R1 and R2, the switches SW1 and SW2, and the virtual router VR. The monitoring apparatus 1 includes functional sections such as an acquisition section 11, a detection section 12, and a rewriting section 13, and stores address management information t1 and path information t2.

The acquisition section 11 acquires information from the routers R1 and R2 and the switches SW1 and SW2. Examples of the information to be acquired include address information of an ARP table of each of the routers R1 and R2, address information of a MAC (Media Access Control) table of each of the switches SW1 and SW2, and connection information indicative of a connection to each network device, and the information to be acquired is not limited thereto. The address information and the connection information to be acquired are stored as the address management information t1. In addition, the acquisition of the information by the acquisition section 11 may be performed, e.g., periodically or in response to a request from the outside, but is not limited thereto.

The detection section 12 detects a failure of a target network device to be monitored. The detection section 12 can detect the failure of the virtual router VR. When the failure occurs in the virtual router VR, packet loss, link down, or the like of the switches SW1 and SW2 connected to the virtual router occurs. In the case where packet counters (not shown) of the switches SW1 and SW2 detect the packet loss or the like successively, it is determined that the failure is present, and it is possible to notify the monitoring apparatus 1 of the failure. The detection section 12 can receive the notification of the failure. In addition, the monitoring apparatus 1 monitors a link state of the network device periodically, and the detection section 12 can receive the notification of the link down from the network device.

Further, the detection section 12 can also be means for performing periodic communication acknowledgement with ping or the like for the virtual router VR.

The rewriting section 13 rewrites the contents of the address management information t1 and the path information t2 according to the failure detected by the detection section 12. The rewriting section 13 extracts a network device which requires rewriting of the table (the ARP table or the MAC table) according to the failure, and rewrites the address management information t1 for the extracted network device such that communication which avoids the failure is implemented. In addition, the rewriting section 13 accesses the network device and issues an instruction to rewrite the table of the network device according to the rewriting of the address management information t1.

The address management information t1 is information for integrally managing the tables of the network devices. In the present embodiment, the address management information t1 includes the ARP tables of the routers R1 and R2 and the MAC tables of the switches SW1 and SW2. The monitoring apparatus 1 can manage the port in charge of the connection between the network devices with the address management information t1 to constitute the connection information.

The path information t2 indicates the network device in charge of the transfer of the packet by the communication between the internal apparatus d1 and the external apparatus d2.

[Operation of VRRP (L3HA) in Virtual Infrastructure]

The communication between the internal apparatus d1 and the external apparatus d2 will be described.

With regard to the router R1, it is assumed that an IP address: 10.0.0.1/24 and a MAC address: 00-00-00-00-00-01 are assigned, and the priority is a priority: 100.

With regard to the router R2, it is assumed that the IP address: 10.0.0.2/24 and the MAC address: 00-00-00-00-00-02 are assigned, and the priority is a priority: 50.

With regard to the virtual router VR, it is assumed that a virtual IP (VIP) address for the switch SW2: 10.0.0.254/24 and a virtual MAC address: 00-00-5E-00-01-54 are assigned.

Note that the IP address and the MAC address are examples of the address information. In addition, the virtual IP address and the virtual MAC address are examples of the virtual address information.

During a normal time (non-failure time), the priority of the router R1 is higher than the priority of the router R2, and hence the router R1 serves as the master. At this point, in the MAC table (not shown) of the switch SW2, "the virtual MAC address of the virtual router: 00-00-5E-00-01-54 is output from the port P21 due to a connection to the router R1" is set.

The router R1 serving as the master (active system) transmits a VRRP Advertisement to the router R2 serving as a backup (standby system) at predetermined intervals. The external apparatus d2 outputs an ARP request for determining the virtual IP address and the virtual MAC address of the virtual router. As a result, as a response to the ARP request, the router R1 serving as the master transmits the virtual IP address: 10.0.0.254/24 and the virtual MAC address: 00-00-5E-00-01-54 to the external apparatus d2. The external apparatus d2 writes the received virtual IP address: 10.0.0.254/24 and the received virtual MAC address: 00-00-5E-00-01-54 into the ARP table (not shown) of the external apparatus d2.

With regard to the internal apparatus d1 as well, the virtual IP address: 10.0.0.254/24 and the virtual MAC address: 00-00-5E-00-01-54 are written into the ARP table (not shown) of the internal apparatus d1. By performing the above procedure, the virtual router VR in the virtual infrastructure is used, and the communication between the internal apparatus d1 and the external apparatus d2 via the router R1 serving as the master is performed.

At the time of a failure, a failure occurs in the router R1, the transmission of the VRRP Advertisement from the router R1 to the router R2 is interrupted, and communication interruption of a predetermined period occurs. The router R2 does not receive the VRRP Advertisement for the predetermined period and, as a result, the router R2 is promoted to the master. The router R2 having been promoted to the master broadcasts GARP. As a result, the virtual IP address of the virtual router: 10.0.0.254/24 and the virtual MAC address of the virtual router: 00-00-5E-00-01-54 are transmitted.

The MAC table (not shown) of the switch SW2 is updated to "the virtual MAC address of the virtual router: 00-00-5E-00-01-54 is output from the port P22 due to a connection to the router R2". On the other hand, in the external apparatus d2, it is not necessary to change the virtual IP address of the virtual router: 10.0.0.254/24 and the virtual MAC address of the virtual router: 00-00-5E-00-01-54 which are written into the ARP table of the external apparatus d2, and they are not changed. In the internal apparatus d1 as well, the addresses written into the internal apparatus d1 are not changed. As a result, the communication between the internal apparatus d1 and the external apparatus d2 recovers via the router R2.

In the case where a hardware router apparatus is used, the period of the communication interruption caused by the occurrence of a failure is about several seconds. On the other hand, in the case where the virtual router VR in the virtual infrastructure is used, a GARP retransmission waiting time is conventionally fixed to 60 seconds, and hence the period of the communication interruption caused by the occurrence of a failure is increased to 60 seconds, and the recovery of the communication via the router R2 is delayed.

[Processing]

Processing of the monitoring apparatus 1 will be described. An example of the configuration of the network system is the same as that shown in FIG. 1.

<During Normal Time (During Non-Failure Time)>

First, with reference to FIG. 2, processing of the monitoring apparatus 1 during a normal time (during a non-failure time) will be described. In the network system, a path pt which passes through the router R1 is established in the communication between the internal apparatus d1 and the external apparatus d2. The monitoring apparatus 1 stores the path pt as the path information t2.

Figure 2:
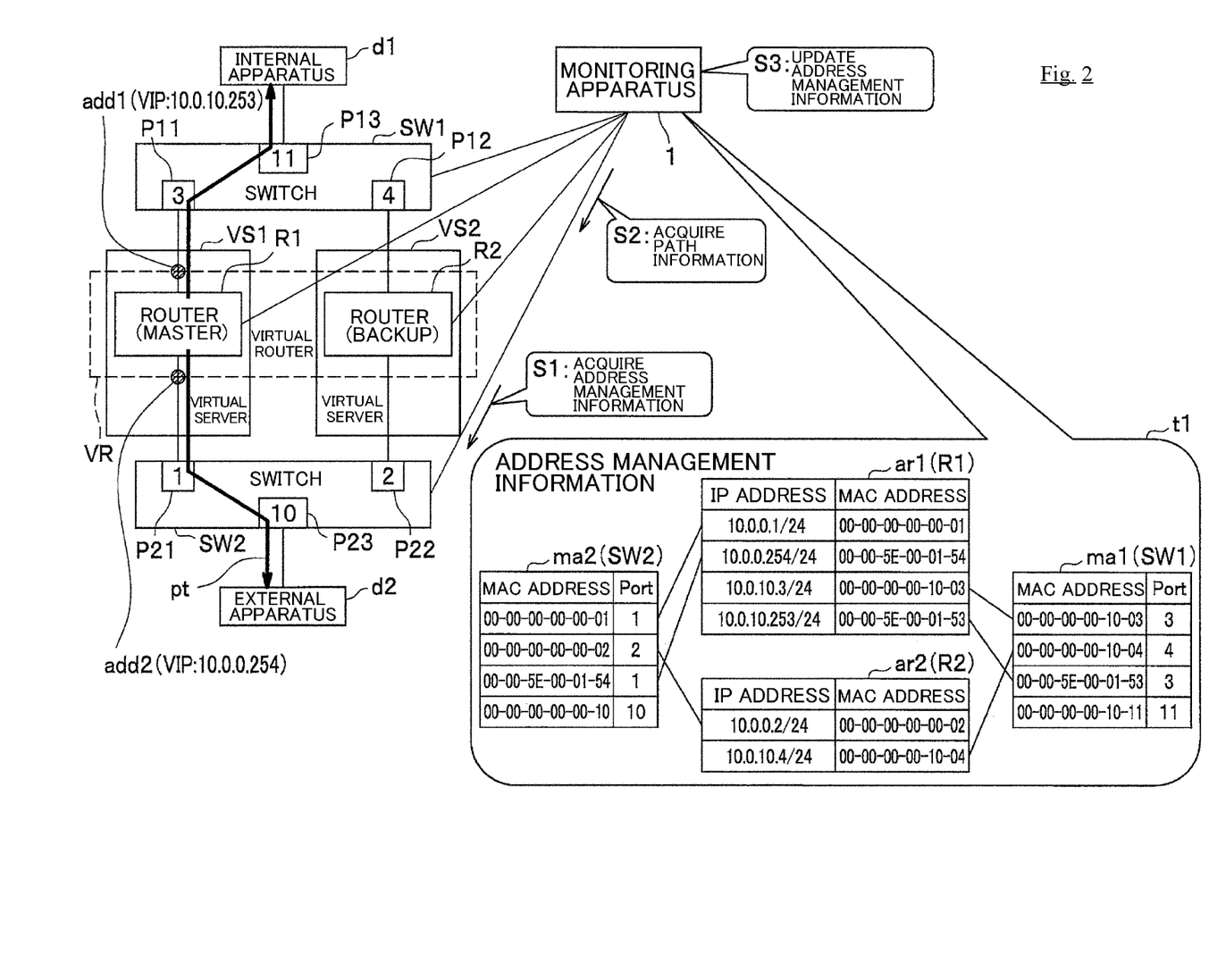
FIG. 2 is an explanatory view of processing during a normal time.

In FIG. 2, a mark add1 denotes the virtual IP address for the switch SW1: 10.0.0.253/24 assigned to the virtual router VR, and a mark add2 denotes the virtual IP address for the switch SW2: 10.0.0.254/24 assigned to the virtual router VR.

The address management information t1 stored in the monitoring apparatus 1 includes an ARP table ar1 identical to the ARP table of the router R1, an ARP table ar2 identical to the ARP table of the router R2, a MAC table ma1 identical to the MAC table of the switch SW1, and a MAC table ma2 identical to the MAC table of the switch SW2.

In the ARP table ar1, "10.0.0.1/24" is the IP address for the switch SW2 assigned to the router R1. Further, "00-00-00-00-00-01" associated with "10.0.0.1/24" is the MAC address of the switch SW2.

In addition, in the ARP table ar1, "10.0.0.254/24" is the virtual IP address for the switch SW2 assigned to the virtual router VR. Further, "00-00-5E-00-01-54" associated with "10.0.0.254/24" is the virtual MAC address of the switch SW2.

In addition, in the ARP table ar1, "10.0.0.3/24" is the IP address for the switch SW1 assigned to the router R1. Further, "00-00-00-00-10-03" associated with "10.0.0.3/24" is the MAC address of the switch SW1.

In addition, in the ARP table ar1, "10.0.0.253/24" is the virtual IP address for the switch SW2 assigned to the virtual router VR. Further, "00-00-5E-00-01-53" associated with "10.0.0.253/24" is the virtual MAC address of the switch SW1.

In the ARP table ar2, "10.0.0.2/24" is the IP address for the switch SW2 assigned to the router R2. Further, "00-00-00-00-00-02" associated with "10.0.0.2/24" is the MAC address of the switch SW2.

In addition, in the ARP table ar2, "10.0.10.4/24" is the IP address for the switch SW2 assigned to the router R2. Further, "00-00-00-00-10-04" associated with "10.0.10.4/24" is the MAC address of the switch SW1.

In the MAC table ma1, the MAC address "00-00-00-00-10-03" is assigned to the port P11 having the port number "3". The MAC address "00-00-00-00-10-03" is in a connection relationship with the IP address of the router R1 "10.0.0.3/24".

In addition, in the MAC table ma1, the MAC address "00-00-00-00-10-04" is assigned to the port P12 having the port number "4". The MAC address "00-00-00-00-10-04" is in the connection relationship with the IP address of the router R2 "10.0.10.4/24".

Further, in the MAC table ma1, the MAC address "00-00-5E-00-01-53" is assigned to the port P11 having the port number "3". The MAC address "00-00-5E-00-01-53" is in the connection relationship with the virtual IP address of the virtual router VR "10.0.0.253/24".

In addition, in the MAC table ma1, the MAC address "00-00-00-00-10-11" is assigned to the port P13 (the connection point to the internal apparatus d1) having the port number "11".

In the MAC table ma2, the MAC address "00-00-00-00-00-01" is assigned to the port P21 having the port number "1". The MAC address "00-00-00-00-00-01" is in the connection relationship with the IP address of the router R1 "10.0.0.1/24".

In addition, in the MAC table ma2, the MAC address "00-00-00-00-00-02" is assigned to the port P12 having the port number "2". The MAC address "00-00-00-00-00-02" is in the connection relationship with the IP address of the router R2 "10.0.0.2/24".

Further, in the MAC table ma2, the MAC address "00-00-5E-00-01-54" is assigned to the port P21 having the port number "1". The MAC address "00-00-5E-00-01-54" is in the connection relationship with the virtual IP address of the virtual router VR "10.0.0.254/24".

In addition, in the MAC table ma2, the MAC address "00-00-00-00-00-10" is assigned to the port P23 (the connection point to the external apparatus d2) having the port number "10".

During the normal time, for example, the switch SW2 periodically acquires the address management information t1 from the monitoring apparatus 1 (Step S1). Specifically, the switch SW2 remotely logs in to the monitoring apparatus 1, transmits a command for acquiring the ARP table (or the MAC table), and receives the address management information t1. In addition, processing corresponding to Step S1 is performed on the network device other than the switch SW2.

Next, for example, the switch SW2 acquires the path information t2 from the monitoring apparatus 1 (Step S2). Specifically, the switch SW2 remotely logs in to the monitoring apparatus 1, transmits a path acquisition command such as traceroute, and receives the path information t2. In addition, processing corresponding to Step S2 is performed on the network device other than the switch SW2. Note that the path information t2 is not the information which is essential to the generation of a mapping described later, and Step S2 can be omitted.

For example, the switch SW2 can generate a correspondence table (mapping) showing a correspondence among the IP address, the MAC address, and the port number from the address management information t1 acquired from the monitoring apparatus 1. In addition, the switch SW2 can generate the mapping by using the path information t2. The correspondence shown by the mapping is represented by the address information of the MAC table and the ARP table, and the connection information indicative of a connection to each of the network devices. The monitoring apparatus 1 acquires the mapping from the switch SW2 with the acquisition section 11.

The mapping indicates which port in the switch is connected to which router by searching the ARP table and the MAC table included in the address management information t1 by using a specific MAC address as a key. For example, in the case where a search is performed to determine whether or not the MAC address of the switch SW2 "00-00-00-00-00-01" is present in a table other than the MAC table ma2 corresponding to the switch SW2, it is found that the MAC address "00-00-00-00-00-01" is present in the ARP table ar1. Therefore, it is found that the port P21 (the port number "1") of the switch SW2 is connected to the router R1.

The monitoring apparatus 1 updates the address management information t1 based on the acquired mapping (Step S3). In addition, processing corresponding to Step S3 is performed on the network device other than the switch SW2. During the normal time, the content of the mapping is usually maintained, and hence the content of the address management information t1 is unchanged.

<At Time of Occurrence of Failure>

Figure 3:
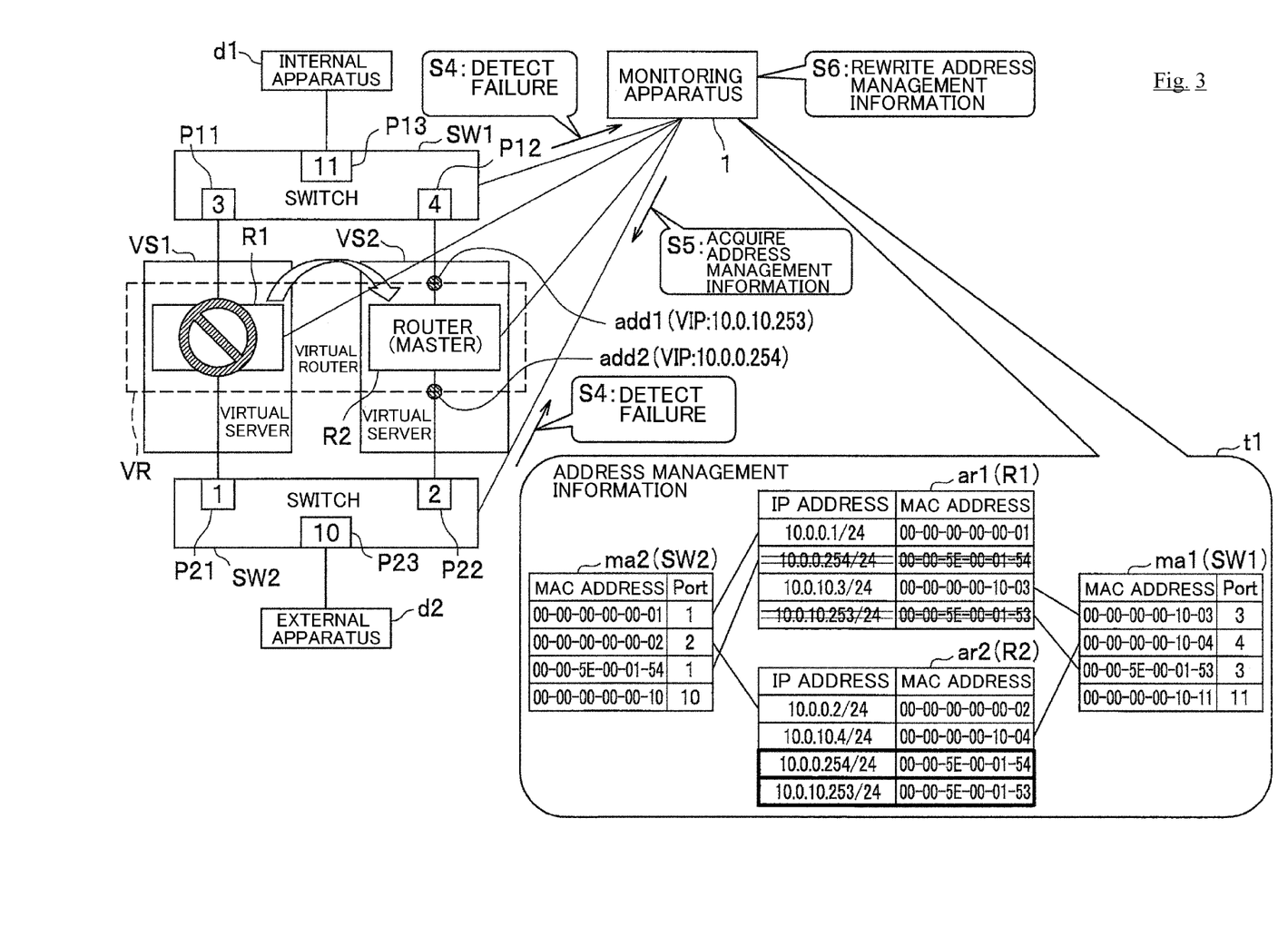
FIG. 3 is an explanatory view of processing (1/3) at the time of occurrence of a failure.

Next, processing of the monitoring apparatus 1 at the time of occurrence of a failure will be described with reference to FIGS. 3 to 5. In FIG. 3, in the case where a failure occurs in the router R1 serving as the master, the router R2 is switched to the master from the backup. In addition, the virtual IP address add1 for the switch SW1 (10.0.0.253/24) and the virtual IP address add2 for the switch SW2 (10.0.0.254/24) move to the router R2.

Further, in the switches SW1 and SW2, packet loss occurs at each of the ports P11 and P21 connected to the router R1 due to the failure of the router R1. Each of the switches SW1 and SW2 determines that the failure is present in the case where the packet loss is repeated a predetermined number of times successively, and notifies the monitoring apparatus 1 of failure information of the router R1. The monitoring apparatus 1 detects the failure based on the notification from each of the switches SW1 and SW2 with the detection section 12 (Step S4).

Next, as preparation for update of the address management information t1 performed based on the failure information of the router R1 by the monitoring apparatus 1, similarly to the normal time, the network device such as the switch SW2 acquires the address management information t1 from the monitoring apparatus 1 (Step S5). Similarly to the normal time, the network device such as the switch SW2 generates the mapping, and the monitoring apparatus 1 acquires the mapping with the acquisition section 11.

Next, the monitoring apparatus 1 rewrites the address management information t1 based on the acquired mapping with the rewriting section 13 (Step S6). The monitoring apparatus 1 can grasp movement to the virtual IP addresses add1 and add2 with the mapping. That is, the monitoring apparatus 1 can grasp the occurrence of mismatch of the connection of the port related to the switches SW1 and SW2. In the address management information t1, the rewriting section 13 deletes the entries of the virtual IP address for the switch SW2 "10.0.0.254/24" and the virtual MAC address "00-00-5E-00-01-54" associated with "10.0.0.254/24" from the ARP table ar1, and adds the entries to the ARP table ar2. In addition, in the address management information t1, the rewriting section 13 deletes the entries of the virtual IP address for the switch SW1 "10.0.0.253/24" and the virtual MAC address "00-00-5E-00-01-53" associated with "10.0.0.253/24" from the ARP table ar1, and adds the entries to the ARP table ar2.

Note that, with regard to each of the switches SW1 and SW2, even when the failure occurs, the information of each of the MAC tables ma1 and ma2 is retained for a specific period due to the aging time of each of the MAC tables, and is not changed immediately.

Figure 4:
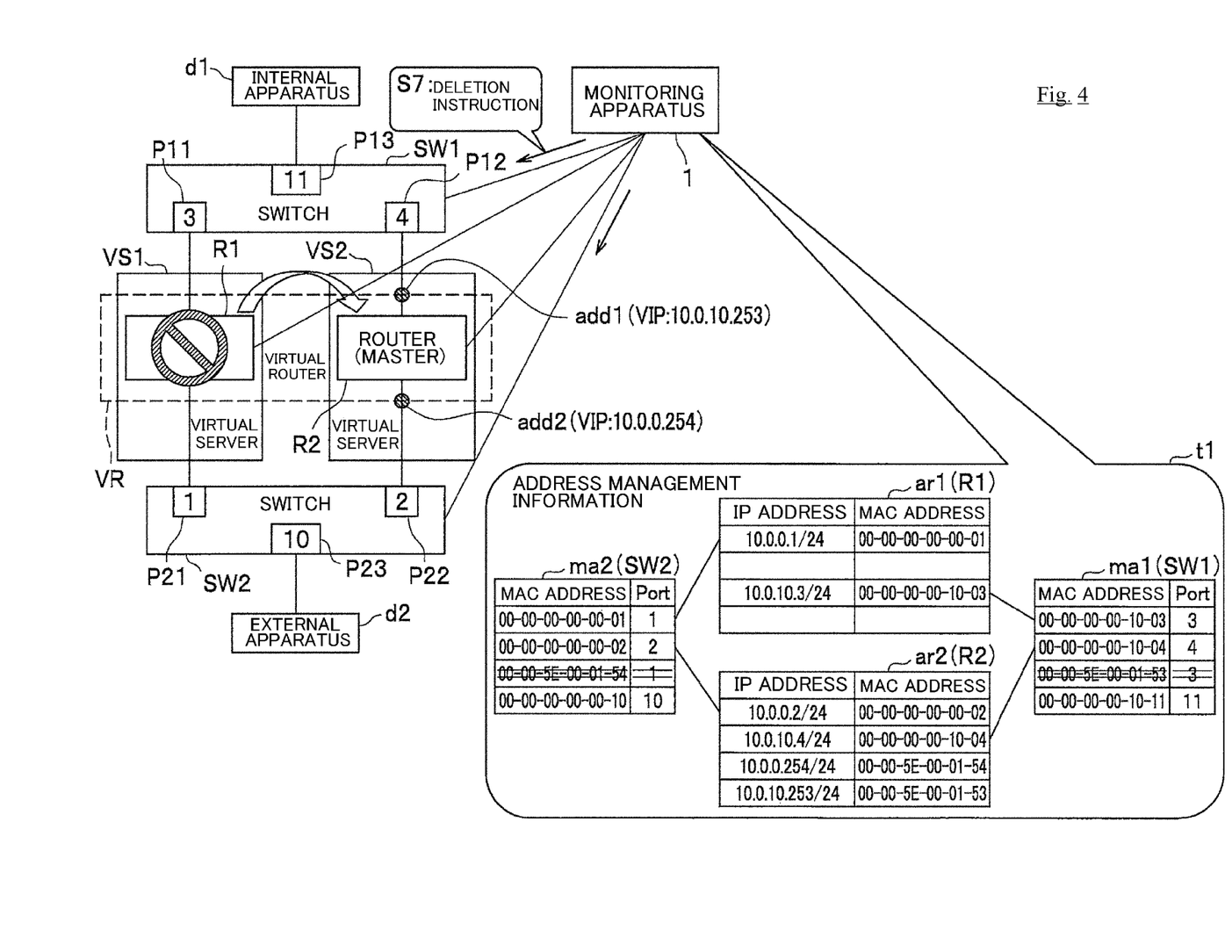
FIG. 4 is an explanatory view of the processing (2/3) at the time of occurrence of a failure.

With reference to FIG. 4, next, the monitoring apparatus 1 instructs the switches SW1 and SW2 to delete the MAC addresses corresponding to the virtual IP addresses add1 and add2 set for the router R1 with the rewriting section 13 (Step S7). In response to the instruction from the monitoring apparatus 1, the switch SW1 deletes the virtual MAC address "00-00-5E-00-01-53" associated with the virtual IP address add1 (10.0.0.253/24) set for the router R1 from the MAC table of the switch SW1. The monitoring apparatus 1 receives information of the MAC table from which the virtual MAC address "00-00-5E-00-01-53" is deleted from the switch SW1 with the acquisition section 11. The monitoring apparatus 1 having received the information deletes the entry of the MAC address "00-00-5E-00-01-53" from the MAC table ma1 of the address management information t1 with the rewriting section 13.

In addition, in response to the instruction from the monitoring apparatus 1, the switch SW2 deletes the virtual MAC address "00-00-5E-00-01-54" associated with the virtual IP address add2 (10.0.0.254/24) set for the router R1 from the MAC table of the switch SW2. The monitoring apparatus 1 receives information of the MAC table from which the virtual MAC address "00-00-5E-00-01-54" is deleted from the switch SW2 with the acquisition section 11. The monitoring apparatus 1 having received the information deletes the entry of the MAC address "00-00-5E-00-01-54" from the MAC table ma2 of the address management information t1 with the rewriting section 13.

Figure 5:
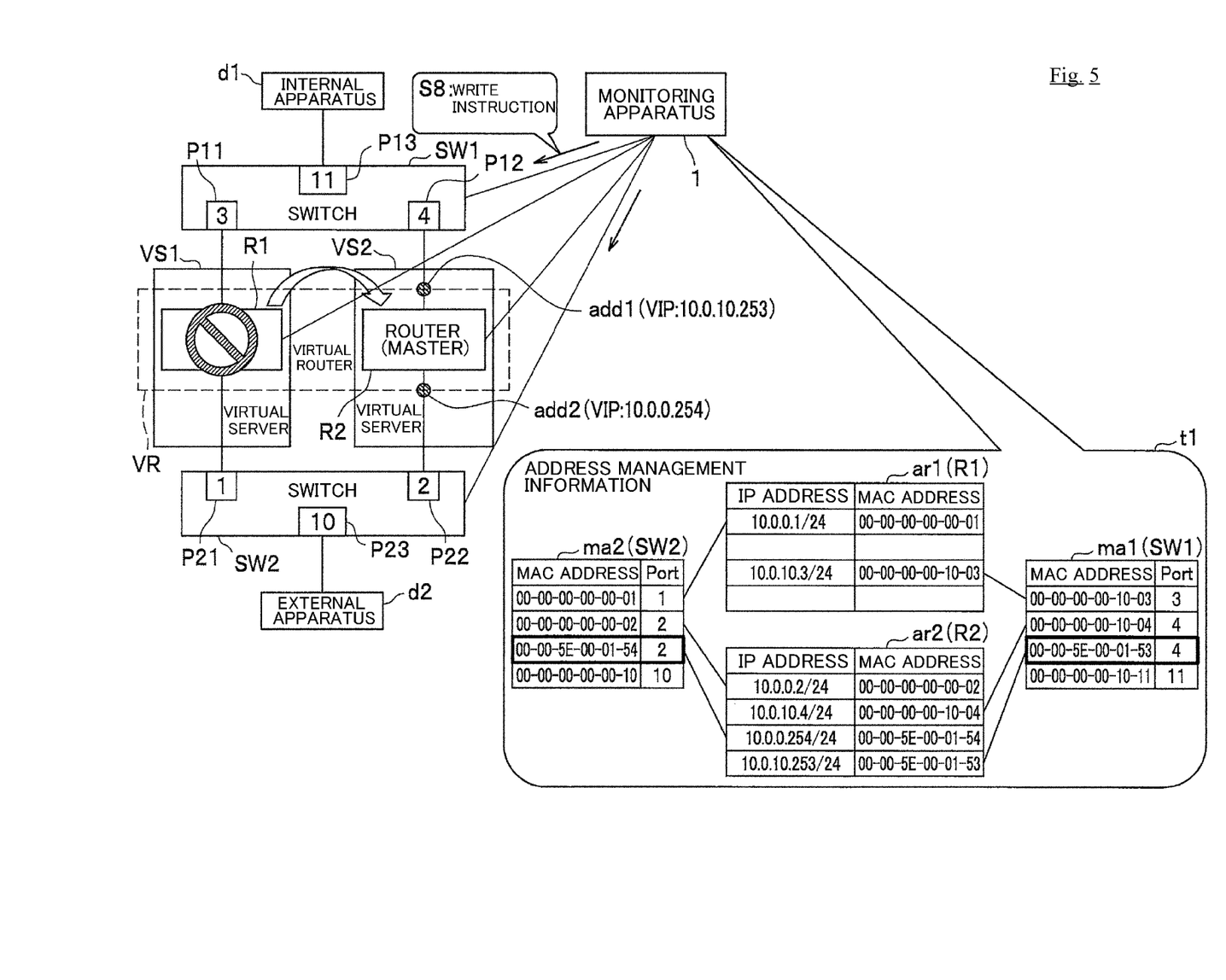
FIG. 5 is an explanatory view of the processing (3/3) at the time of occurrence of a failure.

With reference to FIG. 5, next, the monitoring apparatus 1 instructs the switches SW1 and SW2 to write the MAC addresses corresponding to the virtual IP addresses add1 and add2 which are to be set for the router R2 serving as a new master with the rewriting section 13 (Step S8). In response to the instruction from the monitoring apparatus 1, in the MAC table of the switch SW1, the switch SW1 writes the virtual MAC address "00-00-5E-00-01-53" associated with the virtual IP address add1 (10.0.0.253/24) which is to be set for the router R2 such that the virtual MAC address is linked with the port P12 having the port number "4". The monitoring apparatus 1 receives information of the MAC table into which the virtual MAC address "00-00-5E-00-01-53" is written from the switch SW1 with the acquisition section 11. The monitoring apparatus 1 having received the information writes the entry of the MAC address "00-00-5E-00-01-53" linked with the port number "4" into the MAC table ma1 of the address management information t1 with the rewriting section 13. In addition, the rewriting section 13 constitutes a connection relationship between the entry of the written MAC address "00-00-5E-00-01-53" and the entry of the MAC address "00-00-5E-00-01-53" added to the ARP table ar2 for the router R2.

In addition, in response to the instruction from the monitoring apparatus 1, in the MAC table of the switch SW2, the switch SW2 writes the virtual MAC address "00-00-5E-00-01-54" associated with the virtual IP address add2 (10.0.0.254/24) which is to be set for the router R2 serving as the new master such that the virtual MAC address is linked with the port P22 having the port number "2". The monitoring apparatus 1 receives information of the MAC table into which the virtual MAC address "00-00-5E-00-01-54" is written from the switch SW2 with the acquisition section 11. The monitoring apparatus 1 having received the information writes the entry of the MAC address "00-00-5E-00-01-54" linked with the port number "2" into the MAC table ma2 of the address management information t1 with the rewriting section 13. In addition, the rewriting section 13 constitutes the connection relationship between the entry of the written MAC address "00-00-5E-00-01-54" and the entry of the MAC address "00-00-5E-00-01-54" added to the ARP table ar2 for the router R2.

Note that the processing in Step S8 can also be executed by using start of the communication between the external apparatus d2 and the internal apparatus d1 as a trigger instead of using the instruction to write from the rewriting section 13 as the trigger. In the case where the communication between the external apparatus d2 and the internal apparatus d1 is started, the switches SW1 and SW2 do not have the corresponding MAC addresses (the MAC addresses have been deleted in Step S7) in the MAC tables of the switches SW1 and SW2, and hence each of the switches SW1 and SW2 can transmit the ARP request to the monitoring apparatus 1.

As a response to the ARP request from the monitoring apparatus 1, the switch SW1 receives the virtual MAC address "00-00-5E-00-01-53" associated with the virtual IP address add1 (10.0.0.253/24) which is to be set for the router R2. In addition, in the MAC table of the switch SW1, the switch SW1 writes the received virtual MAC address "00-00-5E-00-01-53" such that the virtual MAC address is linked with the port P12 having the port number "4". As a response to the ARP request from the monitoring apparatus 1, the switch SW2 receives the virtual MAC address "00-00-5E-00-01-54" associated with the virtual IP address add2 (10.0.0.254/24) which is to be set for the router R2. In addition, in the MAC table of the switch SW2, the switch SW2 writes the received virtual MAC address "00-00-5E-00-01-54" such that the virtual MAC address is linked with the port P22 having the port number "2".

With the foregoing, the processing of the monitoring apparatus 1 at the time of occurrence of a failure is completed. According to the processing (FIGS. 3 to 5) of the monitoring apparatus 1 at the time of occurrence of a failure, even in the case where the virtual router VR in the virtual infrastructure is used, it is possible to implement redundancy switching at the time of occurrence of a failure without following the conventional GARP retransmission waiting time (fixed to 60 seconds).

<At Time of Recovery>

Figure 6:
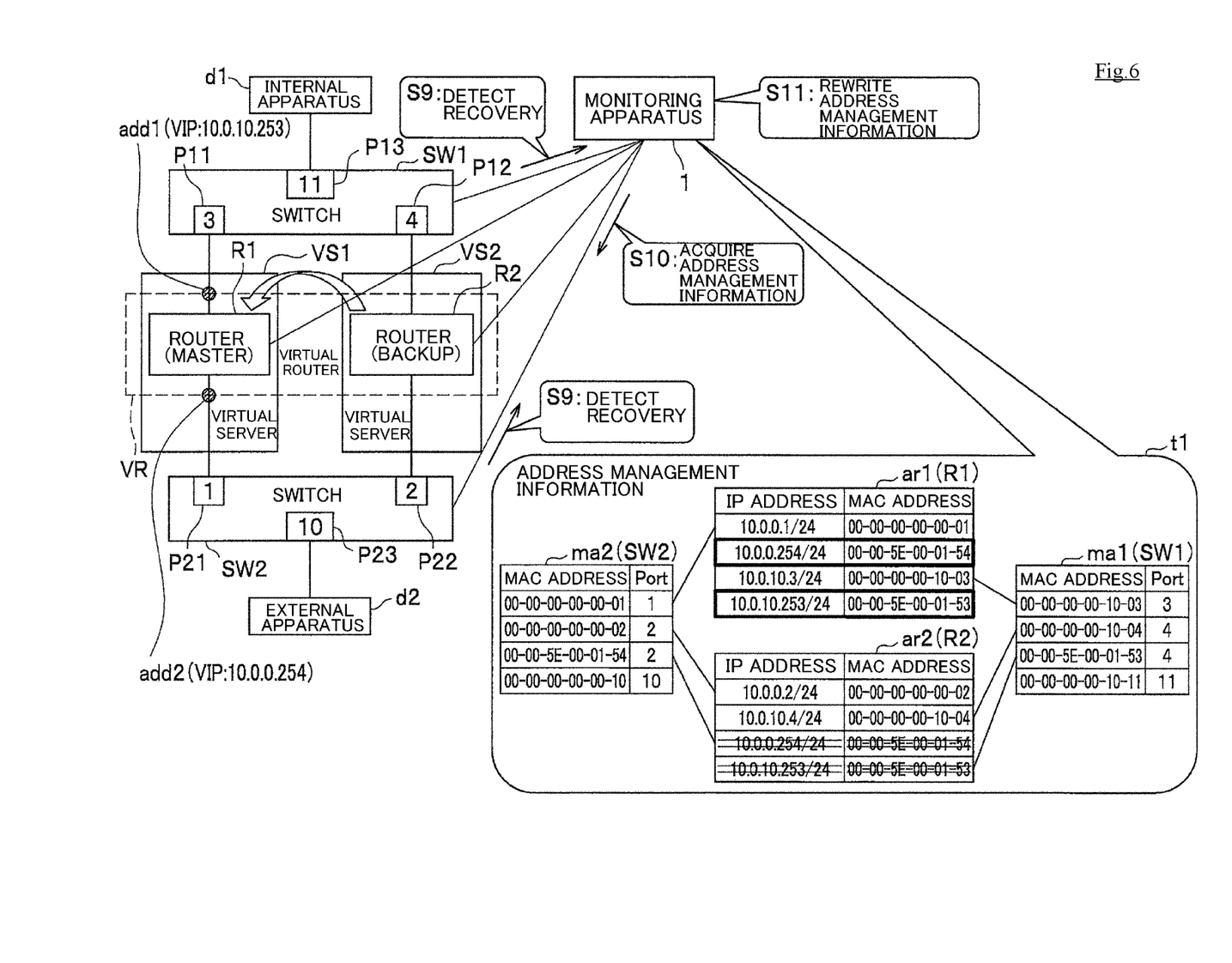
FIG. 6 is an explanatory view of processing (1/3) at the time of recovery.

Next, with reference to FIGS. 6 to 8, processing of the monitoring apparatus 1 at the time of recovery will be described. In FIG. 6, in the case where the router R1 has recovered from the failure, the router R2 receives a survival advertisement packet from the router R1, and the router R1 having the higher priority is switched from the backup to the master. In addition, the virtual IP address add1 for the switch SW1 (10.0.0.253/24) and the virtual IP address add2 for the switch SW2 (10.0.0.254/24) move to the router R1.

At this point, the switches SW1 and SW2 are still directed to the side of the router R2 (the port numbers "2" and "4"), and hence packet loss occurs. Each of the switches SW1 and SW2 determines that the recovery has been made in the case where the packet loss is repeated a predetermined number of times successively, and notifies the monitoring apparatus 1 of recovery information of the router R1. The monitoring apparatus 1 detects the recovery based on the notification from each of the switches SW1 and SW2 with the detection section 12 (Step S9).

Next, as preparation for update of the address management information t1 performed based on the recovery information of the router R1 by the monitoring apparatus 1, similarly to the normal time, the network device such as the switch SW2 acquires the address management information t1 from the monitoring apparatus 1 (Step S10). Similarly to the normal time, the network device such as the switch SW2 generates the mapping, and the monitoring apparatus 1 acquires the mapping with the acquisition section 11.

Next, the monitoring apparatus 1 rewrites the address management information t1 based on the acquired mapping with the rewriting section 13 (Step S11). The monitoring apparatus 1 can grasp the movement to the virtual IP addresses add1 and add2 with the mapping. That is, the monitoring apparatus 1 can grasp the occurrence of mismatch of the connection of the port related to the switches SW1 and SW2. In the address management information t1, the rewriting section 13 deletes the entries of the virtual IP address for the switch SW2 "10.0.0.254/24" and the virtual MAC address "00-00-5E-00-01-54" associated with "10.0.0.254/24" from the ARP table ar2, and adds the entries to the ARP table ar1. In addition, in the address management information t1, the rewriting section 13 deletes the entries of the virtual IP address for the switch SW1 "10.0.0.253/24" and the virtual MAC address "00-00-5E-00-01-53" associated with "10.0.0.253/24" from the ARP table ar2, and adds the entries to the ARP table ar1.

Note that, with regard to each of the switches SW1 and SW2, even when the failure occurs, the information of each of the MAC tables ma1 and ma2 is retained for a specific period due to the aging time of each of the MAC tables, and is not changed immediately.

Figure 7:
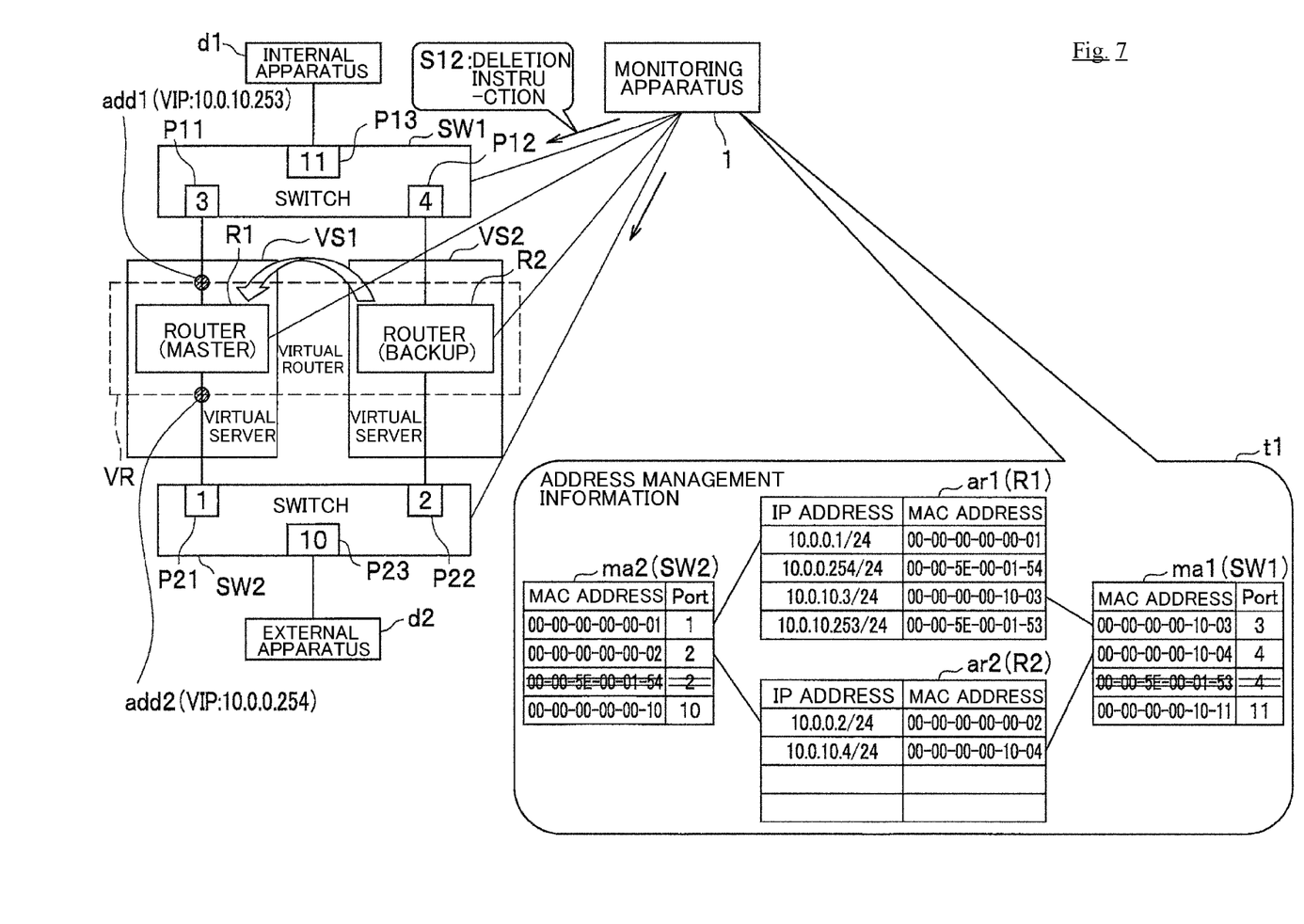
FIG. 7 is an explanatory view of the processing (2/3) at the time of recovery.

With reference to FIG. 7, next, the monitoring apparatus 1 instructs the switches SW1 and SW2 to delete the MAC addresses corresponding to the virtual IP addresses add1 and add2 set for the router R2 with the rewriting section 13 (Step S12). In response to the instruction from the monitoring apparatus 1, the switch SW1 deletes the virtual MAC address "00-00-5E-00-01-53" associated with the virtual IP address add1 (10.0.0.253/24) set for the router R2 from the MAC table of the switch SW1. The monitoring apparatus 1 receives information of the MAC table from which the virtual MAC address "00-00-5E-00-01-53" is deleted from the switch SW1 with the acquisition section 11. The monitoring apparatus 1 having received the information deletes the entry of the MAC address "00-00-5E-00-01-53" from the MAC table ma1 of the address management information t1 with the rewriting section 13.

In addition, in response to the instruction from the monitoring apparatus 1, the switch SW2 deletes the virtual MAC address "00-00-5E-00-01-54" associated with the virtual IP address add2 (10.0.0.254/24) set for the router R2 from the MAC table of the switch SW2. The monitoring apparatus 1 receives information of the MAC table from which the virtual MAC address "00-00-5E-00-01-54" is deleted from the switch SW2 with the acquisition section 11. The monitoring apparatus 1 having received the information deletes the entry of the MAC address "00-00-5E-00-01-54" from the MAC table ma2 of the address management information t1 with the rewriting section 13.

Figure 8:
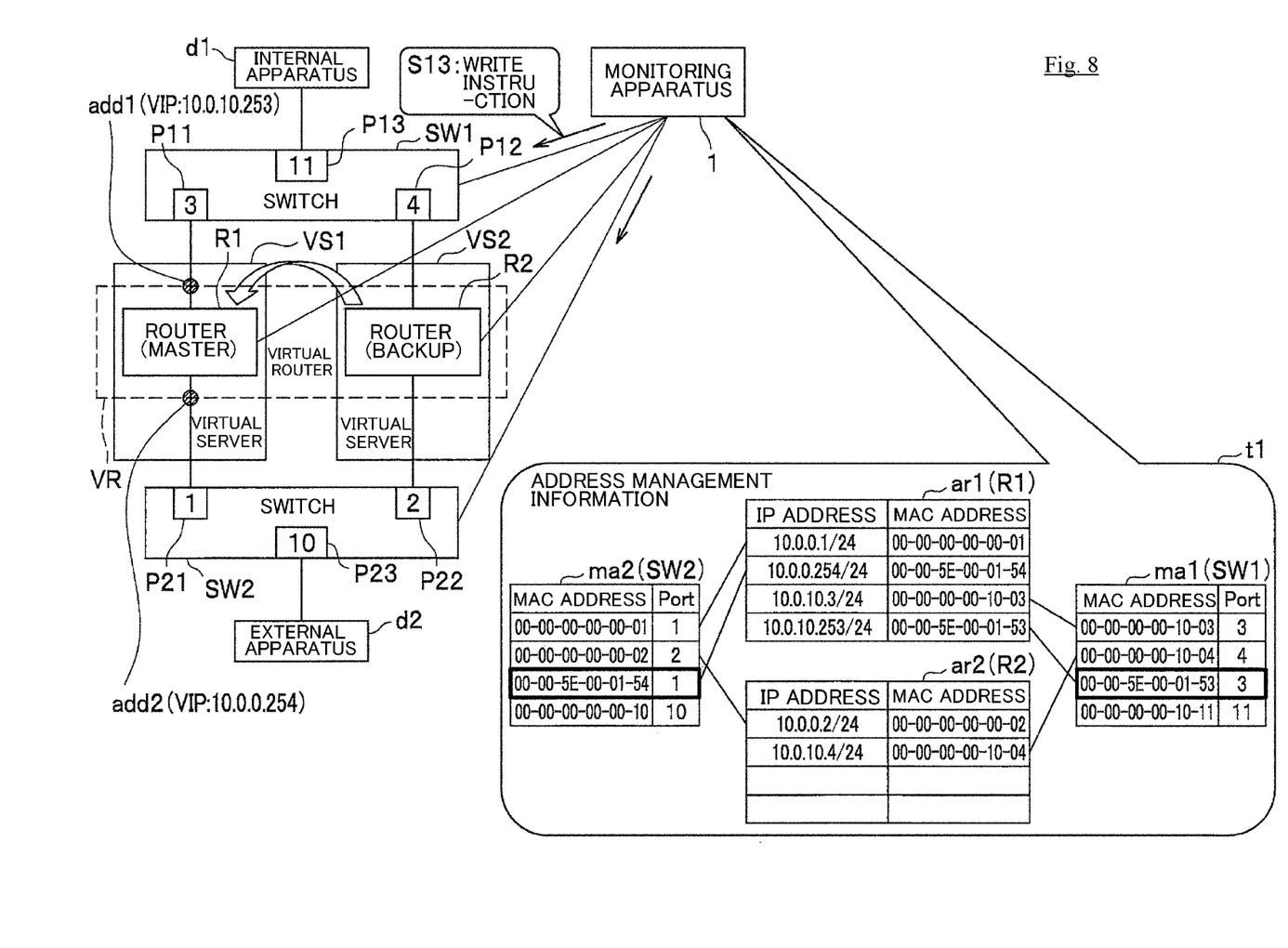
FIG. 8 is an explanatory view of the processing (3/3) at the time of recovery.

With reference to FIG. 8, next, the monitoring apparatus 1 instructs the switches SW1 and SW2 to write the MAC addresses corresponding to the virtual IP addresses add1 and add2 which are to be set for the router R1 serving as the master again with the rewriting section 13 (Step S13). In response to the instruction from the monitoring apparatus 1, in the MAC table of the switch SW1, the switch SW1 writes the virtual MAC address "00-00-5E-00-01-53" associated with the virtual IP address add1 (10.0.0.253/24) which is to be set for the router R1 such that the virtual MAC address is linked with the port P11 having the port number "3". The monitoring apparatus 1 receives information of the MAC table into which the virtual MAC address "00-00-5E-00-01-53" is written from the switch SW1 with the acquisition section 11. The monitoring apparatus 1 having received the information writes the entry of the MAC address "00-00-5E-00-01-53" linked with the port number "3" into the MAC table ma1 of the address management information t1 with the rewriting section 13. In addition, the rewriting section 13 constitutes the connection relationship between the entry of the written MAC address "00-00-5E-00-01-53" and the entry of the MAC address "00-00-5E-00-01-53" added to the ARP table ar1 for the router R1.

In addition, in response to the instruction from the monitoring apparatus 1, in the MAC table of the switch SW2, the switch SW2 writes the virtual MAC address "00-00-5E-00-01-54" associated with the virtual IP address add2 (10.0.0.254/24) which is to be set for the router R2 serving as the master again such that the virtual MAC address is linked with the port P21 having the port number "1". The monitoring apparatus 1 receives information of the MAC table into which the virtual MAC address "00-00-5E-00-01-54" is written from the switch SW2 with the acquisition section 11. The monitoring apparatus 1 having received the information writes the entry of the MAC address "00-00-5E-00-01-54" linked with the port number "1" into the MAC table ma2 of the address management information t1 with the rewriting section 13. In addition, the rewriting section 13 constitutes the connection relationship between the entry of the written MAC address "00-00-5E-00-01-54" and the entry of the MAC address "00-00-5E-00-01-54" added to the ARP table ar1 for the router R1.

Note that the processing in Step S13 can also be executed by using the start of the communication between the external apparatus d2 and the internal apparatus d1 as a trigger instead of using the instruction to write from the rewriting section 13 as the trigger. In the case where the communication between the external apparatus d2 and the internal apparatus d1 is started, the switches SW1 and SW2 do not have the corresponding MAC addresses (the MAC addresses have been deleted in Step S12) in the MAC tables of the switches SW1 and SW2, and hence each of the switches SW1 and SW2 can transmit the ARP request to the monitoring apparatus 1.

As a response to the ARP request from the monitoring apparatus 1, the switch SW1 receives the virtual MAC address "00-00-5E-00-01-53" associated with the virtual IP address add1 (10.0.0.253/24) which is to be set for the router R1. In addition, in the MAC table of the switch SW1, the switch SW1 writes the received virtual MAC address "00-00-5E-00-01-53" such that the virtual MAC address is linked with the port P12 having the port number "3". As a response to the ARP request from the monitoring apparatus 1, the switch SW2 receives the virtual MAC address "00-00-5E-00-01-54" associated with the virtual IP address add2 (10.0.0.254/24) which is to be set for the router R1. In addition, in the MAC table of the switch SW2, the switch SW2 writes the received virtual MAC address "00-00-5E-00-01-54" such that the virtual MAC address is linked with the port P22 having the port number "1".

With the foregoing, the processing of the monitoring apparatus 1 at the time of recovery is completed. According to the processing (FIGS. 6 to 8) of the monitoring apparatus 1 at the time of recovery, even in the case where the virtual router VR in the virtual infrastructure is used, it is possible to implement redundancy switching at the time of recovery without following the conventional GARP retransmission waiting time (fixed to 60 seconds).

<Hardware Configuration>

Figure 9:
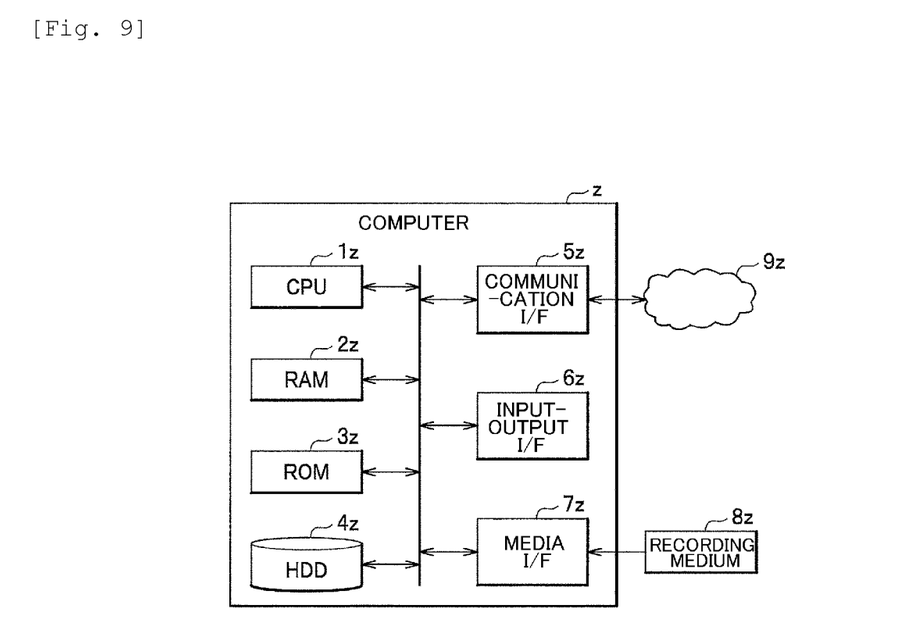
FIG. 9 is a hardware configuration diagram showing an example of a computer which implements the function of the monitoring apparatus.

In addition, the monitoring apparatus 1 described above is implemented by a computer z represented by, e.g., a hardware configuration shown in FIG. 9. The computer z has a CPU 1z, a RAM 2z, a ROM 3z, an HDD 4z, a communication I/F (interface) 5z, an input-output I/F 6z, and a media I/F 7z.

The CPU 1z operates based on a program (including a redundancy switching program) stored in the ROM 3z or the HDD 4z, and performs control of individual sections (including the acquisition section 11, the detection section 12, and the rewriting section 13). The ROM 3z stores a boot program which is executed by the CPU 1z when the computer z is activated, and a program and the like which depends on the hardware of the computer z.

The HDD 4z stores a program which is executed by the CPU 1z, data used by such a program (including the address management information t1 and the path information t2), and the like. The communication I/F 5z receives data from other devices via a communication network 9z and sends the data to the CPU 1z, and transmits data generated by the CPU 1z to other devices via the communication network 9z.

The CPU 1z controls an output apparatus such as a display or a printer, and an input apparatus such as a keyboard or a mouse via the input-output I/F 6z. The CPU 1z acquires data from the input apparatus via the input-output I/F 6z. In addition, the CPU 1z outputs generated data to the output apparatus via the input-output I/F 6z.

The media I/F 7z reads a program or data stored in a recording medium 8z, and provides the program or the data to the CPU 1z via the RAM 2z. The CPU 1z loads such a program from the recording medium 8z onto the RAM 2z via the media I/F 7z, and executes the loaded program. The recording medium 8z is, e.g., an optical recording medium such as a DVD (Digital Versatile Disc) or a PD (Phase change rewritable Disk), a magneto-optical recording medium such as an MO (Magneto Optical disk), a tape medium, a magnetic recording medium, or a semiconductor memory.

For example, in the case where the computer z functions as the monitoring apparatus 1, the CPU 1z of the computer z implements the functions of the individual sections by executing a program loaded onto the RAM 2z. When the program is executed, data or the like stored in the HDD 4z is used. The CPU 1z of the computer z reads these programs from the recording medium 8z and executes them, but, as another example, the CPU 1z may also acquire these programs from another apparatus via the communication network 9z.

<Effect>

As described above, the monitoring apparatus 1 of the present embodiment is the monitoring apparatus 1 for monitoring a plurality of the network devices disposed in the network in the virtual infrastructure which uses the virtual router VR, the monitoring apparatus 1 storing the address management information t1 which indicates the address information of each of the network devices and also indicates the connection to each of the network devices, the network devices including the router R1 in which the virtual router VR is formed and which functions as the master during the non-failure time and the router R2 in which the virtual router VR is formed and which functions as the master at the time of a failure and is different from the router R1, the monitoring apparatus 1 including the detection section 12 which detects the failure of the router R1 with the notification from each of the network devices, the acquisition section 11 which acquires the information from each of the network devices to cope with the detected failure, and the rewriting section 13 which rewrites the address management information t1 such that the router R2 has the virtual address information set in the virtual router VR based on the acquired information.

With this, even in the case where the virtual router VR in the virtual infrastructure is used, it is possible to implement redundancy switching at the time of occurrence of a failure without following the conventional GARP retransmission waiting time (fixed to 60 seconds). Consequently, it is possible to improve the availability of the network in the virtual infrastructure.

In addition, in the monitoring apparatus 1 of the present embodiment, the detection section 12 detects the recovery of the router R1 with the notification from each of the network devices, the acquisition section 11 acquires the information from each of the network devices to cope with the detected recovery, and the rewriting section 13 rewrites the address management information t1 such that the router R1 has the virtual address information based on the acquired information.

With this, even in the case where the virtual router VR in the virtual infrastructure is used, it is possible to implement redundancy switching at the time of recovery without following the conventional GARP retransmission waiting time (fixed to 60 seconds).

<Others>

The present invention can also be applied to the virtual router constituted by three or more routers, i.e., communication in the virtual infrastructure having a redundancy of 2 or more. It is also possible to implement a technique in which various techniques described in the present embodiment are appropriately combined.

REFERENCE SIGNS LIST

1 Monitoring apparatus
11 Acquisition section
12 Detection section

13 Rewriting section
t1 Address management information
t2 Path information
d1 Internal apparatus
d2 External apparatus
SW1, SW2 Switch
R1, R2 Router

The invention claimed is:

1. A monitoring apparatus for monitoring a plurality of network devices disposed in a network in a virtual infrastructure, the virtual infrastructure using a virtual router,
wherein the monitoring apparatus stores address management information that indicates address information of each of the network devices and also indicates a connection to each of the network devices, and
wherein the network devices comprise:
a first router in which the virtual router is formed, wherein the first router functions as a master during a non-failure time;
a second router in which the virtual router is formed, wherein the second router functions as the master at a time of a failure and is different from the first router; and
one or more switches;
the monitoring apparatus, including one or more processors, comprising:
a detection section configured to detect a failure of the first router based on notifications received from one or more of the network devices;
an acquisition section configured to acquire information from each of the network devices and update the address management information using the acquired information, the acquired information comprising: (i) a first Address Resolution Protocol (ARP) table acquired from the first router, (ii) a second ARP table acquired from the second router, and (iii) a respective Media Access Control (MAC) table from each of the switches; and
a rewriting section configured to rewrite the address management information such that the second router has virtual address information set in the virtual router based on the acquired information, the rewriting comprising: (i) removing one or more entries from the first ARP table, (ii) adding one or more entries to the second ARP table, and (iii) removing one or more entries from each of the MAC tables.

2. The monitoring apparatus according to claim 1, wherein
the detection section is further configured to detect recovery of the first router based on notifications from one or more of the network devices,
the acquisition section is further configured to acquire information from each of the network devices to cope with the detected recovery, and
the rewriting section is further configured to rewrite the address management information such that the first router has the virtual address information based on the acquired information.

3. A network system comprising:
the monitoring apparatus according to claim 1; and
the network devices according to claim 1.

4. A redundancy switching method in a monitoring apparatus for monitoring a plurality of network devices disposed in a network in a virtual infrastructure, the virtual infrastructure using a virtual router, wherein the monitoring apparatus stores address management information that indicates address information of each of the network devices and also indicates a connection to each of the network devices, and wherein the network devices comprises: a first router in which the virtual router is formed, wherein the first router functions as a master during a non-failure time; a second router in which the virtual router is formed; and one or more switches, wherein the second router functions as the master at a time of a failure and is different from the first router, the monitoring apparatus executing:
a detection step of detecting a failure of the first router based on notifications received from one or more of the network devices;
an acquisition step of acquiring information from each of the network devices and updating the address management information using the acquired information, the acquired information comprising: (i) a first Address Resolution Protocol (ARP) table acquired from the first router, (ii) a second ARP table acquired from the second router, and (iii) a respective Media Access Control (MAC) table from each of the switches; and
a rewriting step of rewriting the address management information such that the second router has virtual address information set in the virtual router based on the acquired information the rewriting comprising: (i) removing one or more entries from the first ARP table, (ii) adding one or more entries to the second ARP table, and (iii) removing one or more entries from each of the MAC tables.

5. The redundancy switching method according to claim 4, wherein
the monitoring apparatus is configured to detect recovery of the first router based on notifications from one or more of the network devices in the detection step, acquire information from each of the network devices to cope with the detected recovery in the acquisition step, and rewrite the address management information such that the first router has the virtual address information based on the acquired information in the rewriting step.

6. A non-transitory computer-readable storage medium storing a redundancy switching program for causing a computer to execute the redundancy switching method according to claim 3.

7. A non-transitory computer-readable storage medium storing a redundancy switching program for causing a computer to execute the redundancy switching method according to claim 5.

* * * * *